United States Patent [19]
Storm et al.

[11] Patent Number: 5,613,639
[45] Date of Patent: Mar. 25, 1997

[54] ON/OFF CONTROL VALVE FOR A SHOWER HEAD

[76] Inventors: Karl Storm; Susan Storm, both of 107 Roundhill Rd., Kennett Square, Pa. 19348

[21] Appl. No.: 514,690

[22] Filed: Aug. 14, 1995

[51] Int. Cl.$^6$ ...................................................... B05B 1/30
[52] U.S. Cl. .................................. 239/581.1; 137/625.32
[58] Field of Search ........................... 137/625.28, 625.3; 239/581.1

[56] References Cited

U.S. PATENT DOCUMENTS

| | | | |
|---|---|---|---|
| 672,384 | 4/1901 | Marvin | 137/625.28 |
| 1,167,145 | 1/1916 | Baverey | 137/625.31 |
| 1,522,353 | 1/1925 | Whiteman | 137/625.32 |
| 3,134,405 | 5/1964 | White et al. | 137/625.32 |
| 4,145,004 | 3/1979 | Krizik | 137/625.31 |

FOREIGN PATENT DOCUMENTS 1480823  5/1989  U.S.S.R. .............. 239/581.1

*Primary Examiner*—Kevin Weldon

[57] ABSTRACT

An on/off control valve for a shower head comprised of a hollow cylindrical unit having an open first end and an open second end. The open first end is adapted for removable coupling with an existing shower line. The unit has a circular chamber formed therein inwardly of the open first end. A by-pass recess is formed within the circular chamber of the unit. A ball valve is rotatably secured within the circular chamber of the unit. The ball valve has a drainage aperture formed through a central portion thereof. The ball valve is rotatable within the circular chamber to a first position with the drainage aperture in alignment with the open first end and the open second end of the unit to facilitate the movement of water therethrough and to a second position whereby the drainage aperture is not in alignment with the open first end and the open second end of the unit thereby inhibiting the movement of water therethrough. A control mechanism is secured to a side portion of the shower head. The control mechanism is rotatable to an on position to rotate the ball valve to the first position and rotatable to an off position to rotate the ball valve to the second position.

5 Claims, 4 Drawing Sheets

5,613,639

ON/OFF CONTROL VALVE FOR A SHOWER HEAD

BACKGROUND OF THE INVENTION

1. Field of the Invention

The present invention relates to an on/off control valve for a shower head and more particularly pertains to temporarily discontinuing flow of mixed water from a shower head with an on/off control valve for a shower head.

2. Description of the Prior Art

The use of shower heads is known in the prior art. More specifically, shower heads heretofore devised and utilized for the purpose of varying flow of water are known to consist basically of familiar, expected and obvious structural configurations, notwithstanding the myriad of designs encompassed by the crowded prior art which have been developed for the fulfillment of countless objectives and requirements.

By way of example, U.S. Pat. No. Design 293,816 to Bergmann et al. discloses the ornamental design for a combined faucet and diverter valve for a hand shower.

U.S. Pat. No. Design 284,990 to Oglive discloses the ornamental design for a fluid mixing valve for showers or the like.

U.S. Pat. No. 5,246,169 to Heimann et al. discloses a shower head.

U.S. Pat. No. 4,282,899 to Dunckhorst discloses a timed shower head valve.

U.S. Pat. No. 4,508,141 to Tsipov discloses a shower valve.

U.S. Pat. No. 5,274,860 to Avila discloses a water conserving shower assembly.

U.S. Pat. No. 4,224,700 to Bloys discloses a water conservation shower.

While these devices fulfill their respective, particular objective and requirements, the aforementioned patents do not describe an on/off control valve for a shower head for temporarily discontinuing flow of mixed water from a shower head.

In this respect, the on/off control valve for a shower head according to the present invention substantially departs from the conventional concepts and designs of the prior art, and in doing so provides an apparatus primarily developed for the purpose of temporarily discontinuing flow of mixed water from a shower head.

Therefore, it can be appreciated that there exists a continuing need for new and improved on/off control valve for a shower head which can be used for temporarily discontinuing flow of mixed water from a shower head. In this regard, the present invention substantially fulfills this need.

SUMMARY OF THE INVENTION

In the view of the foregoing disadvantages inherent in the known types of shower heads now present in the prior art, the present invention provides an improved on/off control valve for a shower head. As such, the general purpose of the present invention, which will be described subsequently in greater detail, is to provide a new and improved on/off control valve for a shower head and method which has all the advantages of the prior art and none of the disadvantages.

To attain this, the present invention essentially comprises a hollow cylindrical shower head having an open first end and an open second end. The open first end is internally threaded whereby the open first end is adapted for removable coupling with an existing shower line. The open second end has a water dispersement plate secured therein. The shower head has a circular chamber formed therein inwardly of the open first end. The shower head has an internally threaded opening through an upper portion thereof extending downwardly into the circular chamber. A by-pass recess is formed within the circular chamber of the shower head. The by-pass recess extends from a position relative to the open first end of the shower head to a position relative to the open second end of the shower head. A ball valve is rotatably secured within the circular chamber of the shower head. The ball valve has a drainage aperture formed through a central portion thereof. The ball valve is rotatable within the circular chamber to a first position with the drainage aperture in alignment with the open first end and the open second end of the shower head to facilitate the movement of water therethrough and to a second position whereby the drainage aperture not being in alignment with the open first end and the open second end of the shower head thereby inhibiting the movement of water therethrough. A control mechanism is secured to a side portion of the shower head. The control mechanism has an on/off switch with a shaft extending inwardly of the shower head securing to the ball valve whereby rotation of the on/off switch to an on position rotates the ball valve to the first position and rotation to an off position rotates the ball valve to the second position. A drip adjustment mechanism is adjustably secured within the internally threaded opening in the upper portion of the shower head. The drip adjustment mechanism has a rubber portion disposed on an end portion thereof to control the amount of water entering into the by-pass recess.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

3

It is therefore an object of the present invention to provide a new and improved on/off control valve for a shower head which has all the advantages of the prior art shower heads and none of the disadvantages.

It is another object of the present invention to provide a new and improved on/off control valve for a shower head which may be easily and efficiently manufactured and marketed.

It is a further object of the present invention to provide a new and improved on/off control valve for a shower head which is of durable and reliable construction.

An even further object of the present invention is to provide a new and improved on/off control valve for a shower head which is susceptible of a low cost of manufacture with regard to both materials and labor, and which accordingly is then susceptible of low prices of sale to the consuming public, thereby making such an on/off control valve for a shower head economically available to the buying public.

Still yet another object of the present invention is to provide a new and improved on/off control valve for a shower head which provides in the apparatuses and methods of the prior art some of the advantages thereof, while simultaneously overcoming some of the disadvantages normally associated therewith.

Even still another object of the present invention is to provide a new and improved on/off control valve for a shower head for temporarily discontinuing flow of mixed water from a shower head.

Lastly, it is an object of the present invention to provide a new and improved on/off control valve for a shower head comprised of a hollow cylindrical unit having an open first end and an open second end. The open first end is internally threaded whereby the open first end is adapted for removable coupling with an existing shower line. The unit has a circular chamber formed therein inwardly of the open first end. A by-pass recess is formed within the circular chamber of the unit. The by-pass recess extends from a position relative to the open first end of the unit to a position relative to the open second end of the unit. A ball valve is rotatably secured within the circular chamber of the unit. The ball valve has a drainage aperture formed through a central portion thereof. The ball valve is rotatable within the circular chamber to a first position with the drainage aperture in alignment with the open first end and the open second end of the unit to facilitate the movement of water therethrough and to a second position whereby the drainage aperture is not in alignment with the open first end and the open second end of the unit thereby inhibiting the movement of water therethrough. A control mechanism is secured to a side portion of the shower head. The control mechanism is rotatable to an on position to rotate the ball valve to the first position and rotatable to an off position to rotate the ball valve to the second position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
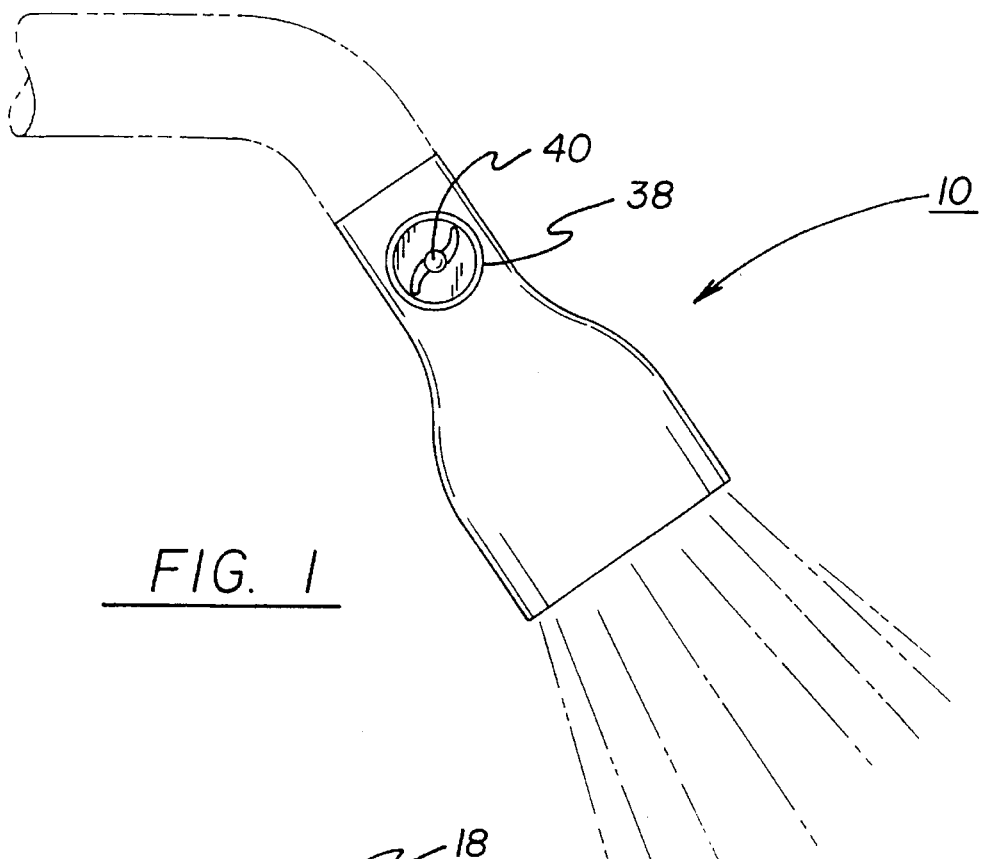
FIG. 1 is a perspective view of the preferred embodiment of the on/off control valve for a shower head constructed in accordance with the principles of the present invention.
Figure 2:
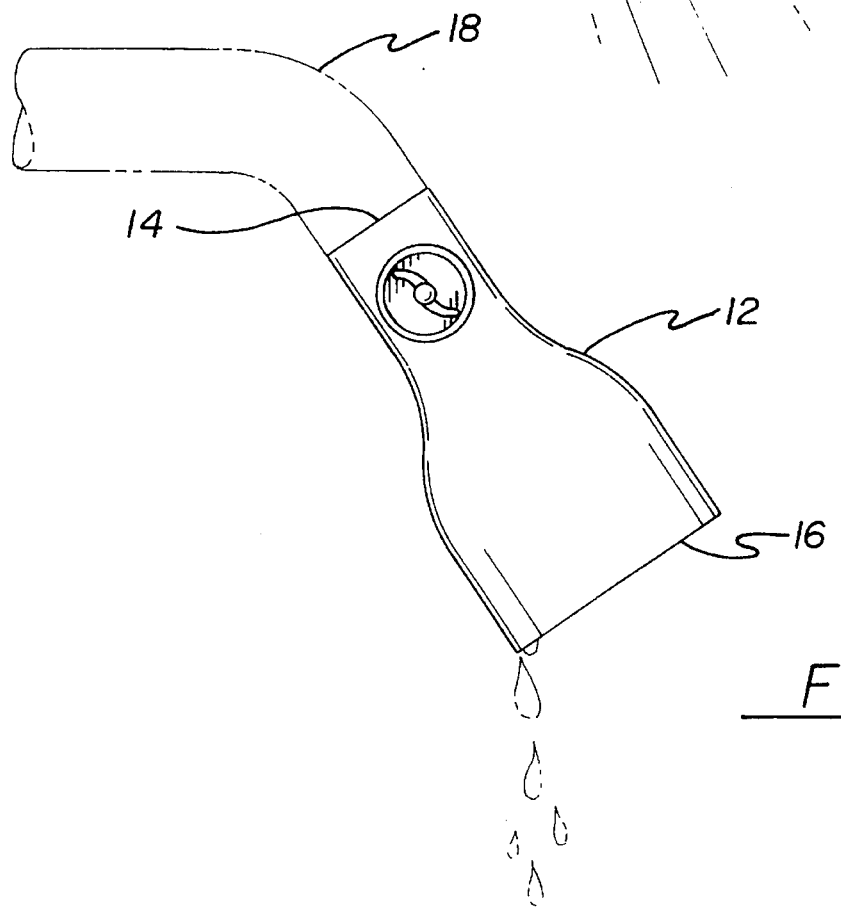
FIG. 2 is a perspective view of the present invention with the ball valve in the closed position.
Figure 3:
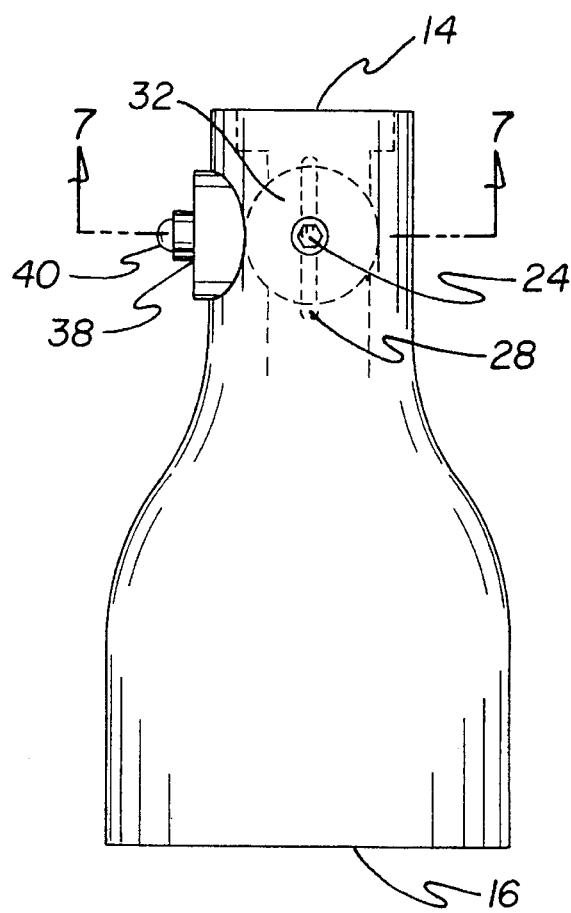
FIG. 3 is a plan view of the present invention illustrating the by pass tube around the ball valve.
Figures 4, 5:
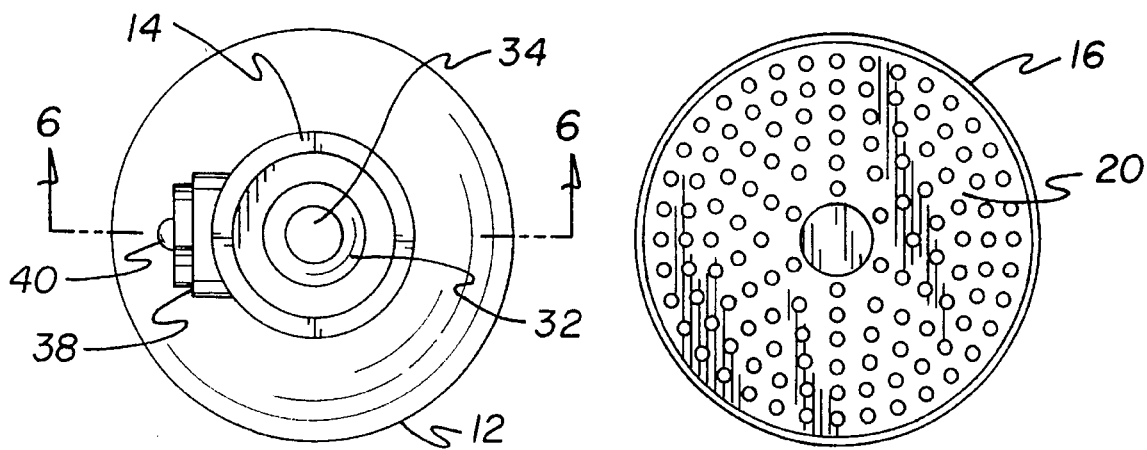
FIG. 4 is an elevated rear view of the present invention.
FIG. 5 is an elevated front view of the present invention.
Figure 6:
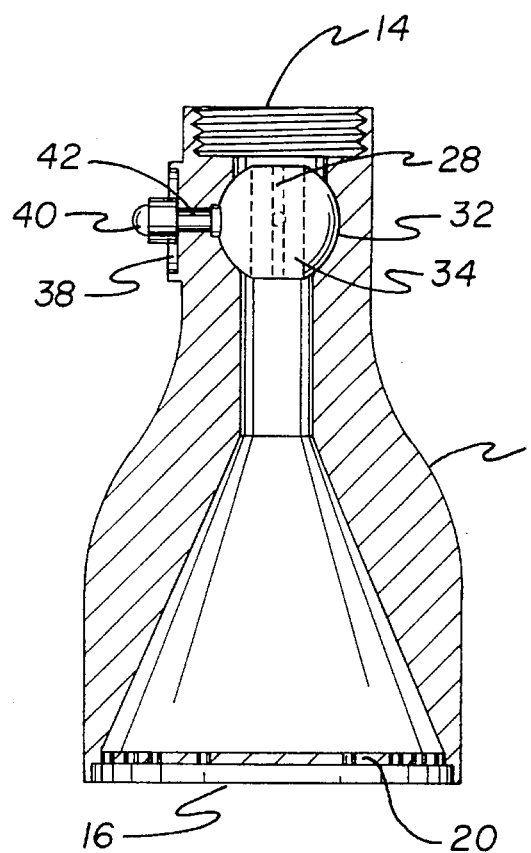
FIG. 6 is a cross-sectional view as taken along line 6—6 of FIG. 4.
Figures 7, 8:
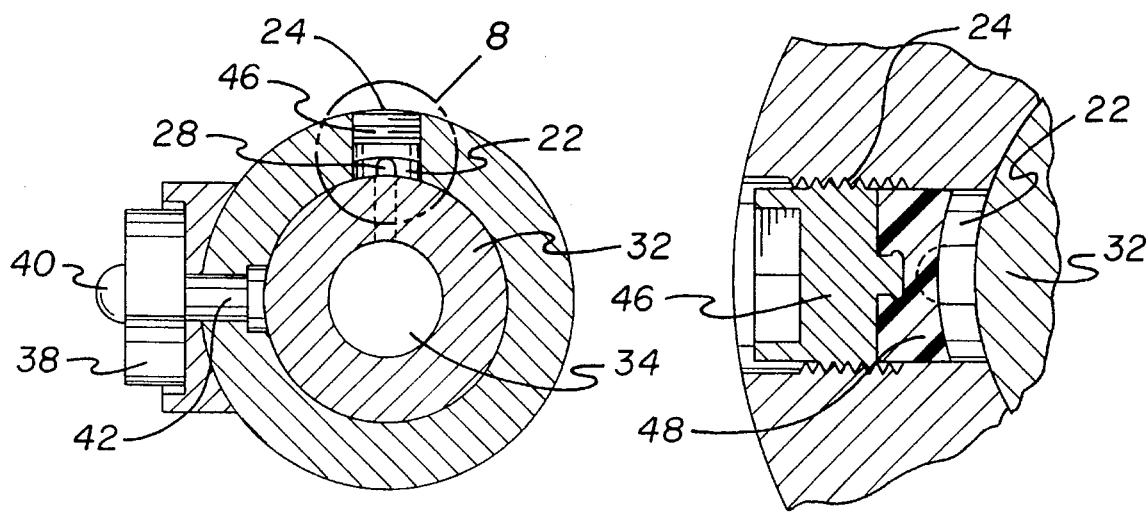
FIG. 7 is a cross-sectional view as taken along line 7—7 of FIG. 3.
FIG. 8 is a fragmentary view of the drip adjuster of the present invention.

With reference now to the drawings, and in particular, to FIG. 1 thereof, the preferred embodiment of the new and improved on/off control valve for a shower head embodying the principles and concepts of the present invention and generally designated by the reference number 10 will be described.

Specifically, it will be noted in the various Figures that the device relates to a new and improved on/off control valve for a shower head for temporarily discontinuing flow of mixed water from a shower head. In its broadest context, the device consists of a hollow cylindrical shower head, by-pass recess, a ball valve, a control mechanism, and a drip control mechanism. Such components are individually configured and correlated with respect to each other so as to attain the desired objective.

The first component of the device 10 is a hollow cylindrical shower head 12. The hollow cylindrical shower head 12 has an open first end 14 and an open second end 16. The open first end 14 is internally threaded whereby the open first end 14 is adapted for removable coupling with an existing shower line 18. The open second end 16 has a water dispersement plate 20 secured therein. The shower head 12 has a circular chamber 22 formed therein inwardly of the open first end 14. The shower head 12 has an internally threaded opening 24 through an upper portion thereof extending downwardly into the circular chamber 22. The shower head 12 resembles a standard shower head in its physical structure and in its functionability. The open second end 16 has a diameter twice that of the open first end 14. The dispersement plate 20 can also be made to be adjustable to allow for a variety of streams of water to pass through. The existing shower line 18 extends through a water mixer that is coupled with hot and cold water controls.

The second component of the device is a by-pass recess 28. The by-pass recess 28 is formed within the circular chamber 22 of the shower head 12. The by-pass recess 28 extends from a position relative to the open first end 14 of the shower head 12 to a position relative to the open second end 16 of the shower head 12. The by-pass recess 28 extends 180 degrees around the circular chamber 22. The by-pass recess 28 allows the passage of water therethrough to constantly alert a user that water is flowing.

The third component of the device 10 is a ball valve 32. The ball valve 32 is rotatably secured within the circular chamber 22 of the shower head 12. The ball valve 32 has a drainage aperture 34 formed through a central portion thereof. The ball valve 32 is rotatable within the circular chamber 22 to a first position with the drainage aperture 34 in alignment with the open first end 14 and the open second end 16 of the shower head 12 to facilitate the movement of water therethrough. Once the water is turned and on and the proper temperature is reached, the water flows through the existing shower line 18 and through the open first end 14 and through the drainage aperture 34 and outwardly of the open second end 16 and the dispersement plate 20 onto a shower user. Once the shower is completed the ball valve 32 can be rotated to a second position whereby the drainage aperture 34 is not in alignment with the open first end 14 and the open second end 16 of the shower head 12 thereby inhibiting the movement of water therethrough. Thus the only water that will exit the shower head 12 is the small amount that will drip through the by-pass recess 28 and out the open second end 16.

The fourth component of the device 10 is a control mechanism 38. The control mechanism 38 is secured to a side portion of the shower head 12. The control mechanism 38 has an on/off switch 40 with a shaft 42 extending inwardly of the shower head 12 securing to the ball valve 32 whereby rotation of the on/off switch 40 to an on position rotates the ball valve 32 to the first position thus allowing the water to flow through the existing shower line 18 and through the open first end 14 of the shower head 12 and through the drainage aperture 34 and outwardly of the open second end 16 and the dispersement plate 20 and onto a shower user. Rotation to an off position rotates the ball valve 32 to the second position whereby the drainage aperture 34 is not in alignment with the open first end 14 and the open second end 16 of the shower head 12 thereby inhibiting the movement of water therethrough.

The final component of the device 10 is a drip adjustment mechanism 46. The drip adjustment mechanism 46 is adjustably secured within the internally threaded opening 24 in the upper portion of the shower head 12. The drip adjustment mechanism 46 has a rubber portion 48 disposed on an end portion thereof to control the amount of water entering into the by-pass recess 28. The drip adjustment mechanism 46 is merely a screw that can be adjusted either inward or outward to lower or raise the rubber portion 48 relative to the by-pass line 28 to control the water that will drip therethrough.

Figure 9:
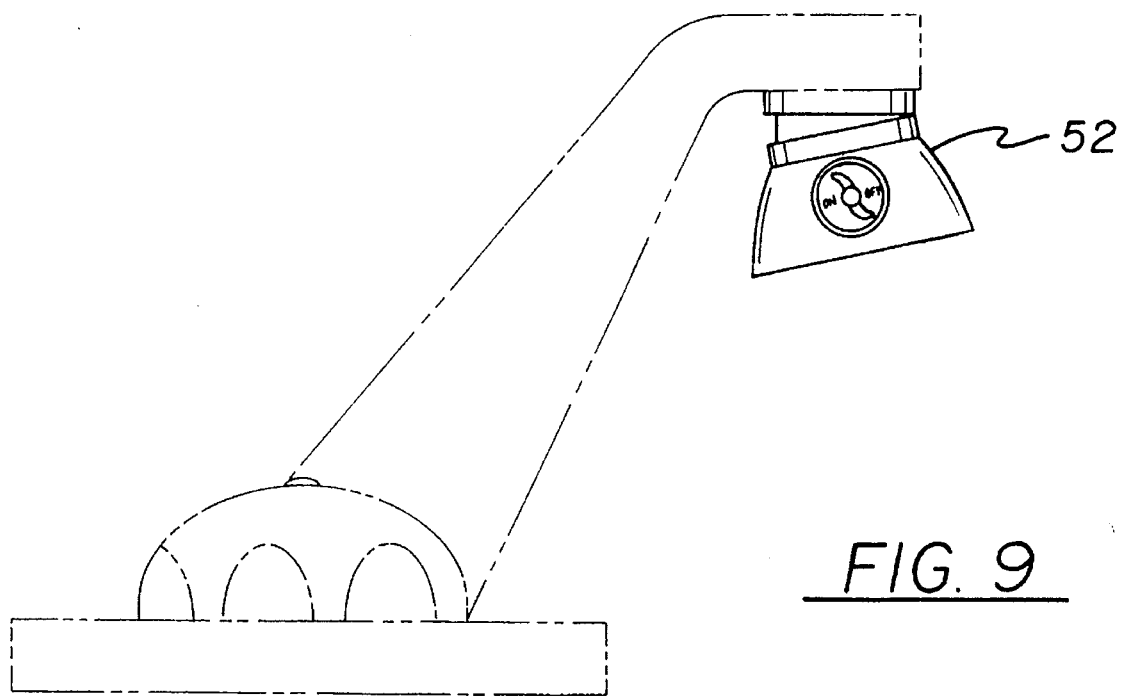
FIG. 9 is a perspective view of a second embodiment of the present invention.

A second embodiment of the present invention is shown in FIG. 9 and includes substantially all of the components of the present invention further including where the device 10 is adapted for use on a sink faucet 52. The function of the device 10 is entirely the same.

Figure 10:
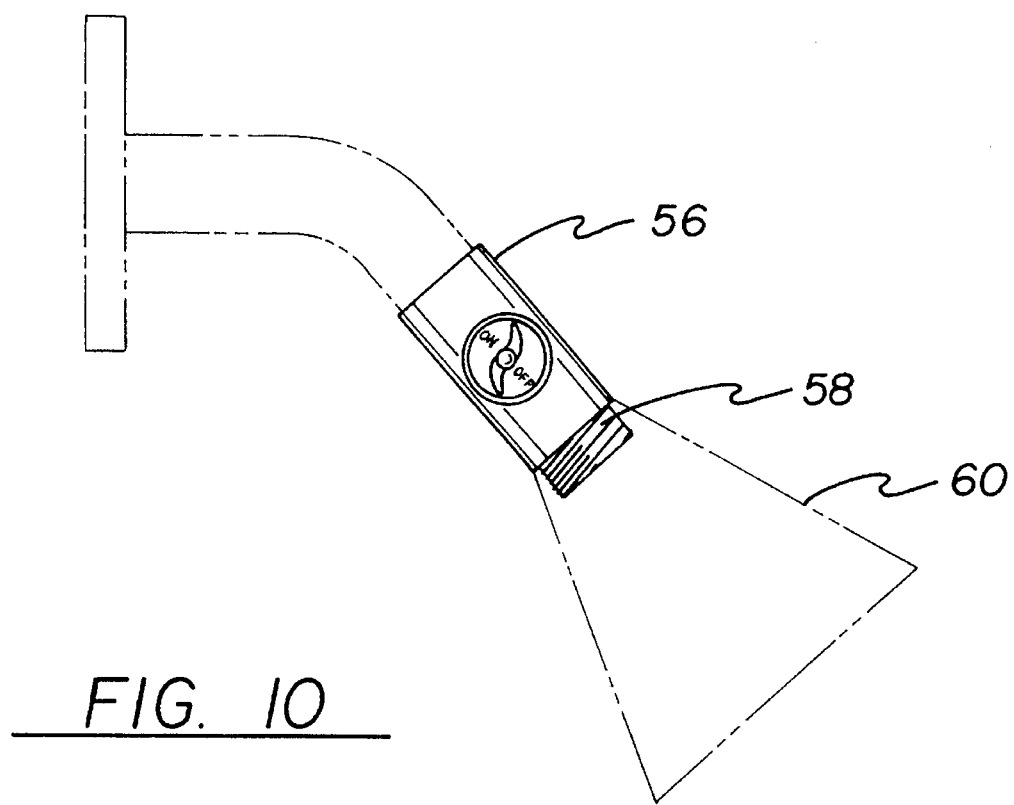
FIG. 10 is a perspective view of a third embodiment of the present invention.

A third embodiment of the present invention is shown in FIG. 10 and includes substantially all of the components of the present invention further including where the device 10 is not a shower head, but instead a hollow unit 56 with the circular chamber 22, the by-pass recess 28, and the ball valve 32 secured therein and also having the control mechanism 38. The hollow unit 56 has a threaded end portion 58 to allow an existing shower head 60 to be secured thereto.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An on/off control valve for a shower head for temporarily discontinuing flow of mixed water from a shower head comprising, in combination:

a hollow cylindrical shower head having an open first end and an open second end, the open first end being internally threaded whereby the open first end being adapted for removable coupling with an existing shower line, the open second end having a water dispersement plate secured therein, the shower head having a circular chamber formed therein inwardly of the open first end, the shower head having an internally threaded opening through an upper portion thereof extending downwardly into the circular chamber;

a by-pass recess formed within the circular chamber of the shower head, the by-pass recess extending from a position relative to the open first end of the shower head to a position relative to the open second end of the shower head;

a ball valve rotatably secured within the circular chamber of the shower head, the ball valve having a drainage aperture formed through a central portion thereof, the ball valve being rotatable within the circular chamber to a first position with the drainage aperture in alignment with the open first end and the open second end of the shower head to facilitate the movement of water therethrough and to a second position whereby the drainage aperture not being in alignment with the open first end and the open second end of the shower head thereby inhibiting the movement of water therethrough;

a control mechanism secured to a side portion of the shower head, the control mechanism having an on/off switch with a shaft extending inwardly of the shower head securing to the ball valve whereby rotation of the on/off switch to an on position rotates the ball valve to the first position and rotation to an off position rotates the ball valve to the second position;

a drip adjustment mechanism being adjustably secured within the internally threaded opening in the upper portion of the shower head, the drip adjustment mechanism having a rubber portion disposed on an end portion thereof to control the amount of water entering into the by-pass recess.

2. An on/off control valve for temporarily discontinuing flow of mixed water comprising, in combination:

a hollow cylindrical unit having an open first end and an open second end, the open first end being internally threaded whereby the open first end being adapted for removable coupling with a water source, the unit having a circular chamber formed therein inwardly of the open first end;

a by-pass recess formed within the circular chamber of the unit, the by-pass recess extending from a position relative to the open first end of the unit to a position relative to the open second end of the unit;

a ball valve rotatably secured within the circular chamber of the unit, the ball valve having a drainage aperture formed through a central portion thereof, the ball valve being rotatable within the circular chamber to a first position with the drainage aperture in alignment with the open first end and the open second end of the unit to facilitate the movement of water therethrough and to a second position whereby the drainage aperture not being in alignment with the open first end and the open second end of the unit thereby inhibiting the movement of water therethrough;

a control mechanism secured to a side portion of the unit, the control mechanism rotatable to an on position to rotate the ball valve to the first position and rotatable to an off position to rotate the ball valve to the second position; and drip adjustment means positioned within the unit.

3. The valve as described in claim 2 wherein the drip adjustment means comprises a drip adjustment mechanism adjustably secured within an internally threaded opening formed in an upper portion of the unit, the drip adjustment mechanism having rubber portion disposed on an end portion thereof to control the amount of water entering into the by-pass recess.

4. The valve as described in claim 3 wherein the control mechanism having an on/off switch.

5. The valve as described in claim 4 wherein the water source is a sink faucet.

\* \* \* \* \*